US012000939B2

(12) United States Patent
Mehta et al.

(10) Patent No.: US 12,000,939 B2
(45) Date of Patent: Jun. 4, 2024

(54) SYSTEMS AND METHODS OF DETERMINING AN IMPROVED USER LOCATION USING REAL WORLD MAP AND SENSOR DATA

(71) Applicant: Google LLC, Mountain View, CA (US)

(72) Inventors: Bhaskar Mehta, Menlo Park, CA (US); Chetan Bhadricha, Fremont, CA (US); Smruti Parichha, Union City, CA (US); Jieru Cheng, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 469 days.

(21) Appl. No.: 16/340,587

(22) PCT Filed: Mar. 20, 2017

(86) PCT No.: PCT/US2017/023200
§ 371 (c)(1),
(2) Date: Apr. 9, 2019

(87) PCT Pub. No.: WO2018/174847
PCT Pub. Date: Sep. 27, 2018

(65) Prior Publication Data
US 2020/0003906 A1 Jan. 2, 2020

(51) Int. Cl.
*G01S 19/50* (2010.01)
*G01C 21/20* (2006.01)
*G01S 5/02* (2010.01)

(52) U.S. Cl.
CPC ............ *G01S 19/50* (2013.01); *G01C 21/206* (2013.01); *G01S 5/0269* (2020.05)

(58) Field of Classification Search
CPC . G01S 19/50; G01S 5/02; G01S 19/42; G01C 21/206; G01C 21/10
See application file for complete search history.

(56) References Cited

U.S. PATENT DOCUMENTS

2006/0271280 A1* 11/2006 O'Clair ............... G06F 16/9537
707/E17.11
2012/0123677 A1 5/2012 Shimotani et al.
(Continued)

FOREIGN PATENT DOCUMENTS

CN 105026888 11/2015

OTHER PUBLICATIONS

International Search Report from PCT/US2017/023200, dated Nov. 27, 2017, 3 pages.
(Continued)

*Primary Examiner* — Mischita L Henson
(74) *Attorney, Agent, or Firm* — DORITY & MANNING P.A.

(57) ABSTRACT

Systems and methods for determining an improved user location using real world map data and/or sensor data are provided. In one embodiment, the method can include obtaining an initial estimate of a location of a user device and maps information corresponding to a geographic area at least partially surrounding the initial estimate of the location of the user device. The maps information can include one or more physical boundaries located at least in part within the geographic area at least partially surrounding the initial estimate. The method can further include determining a set of permissible areas that can potentially include the user device. The set of permissible areas can be determined based at least in part on the one or more physical boundaries. The method can further include revising the initial estimate to provide a revised estimate for the location of the user device based at least in part on the set of permissible areas.

16 Claims, 11 Drawing Sheets

(56) References Cited

U.S. PATENT DOCUMENTS

| | | | |
|---|---|---|---|
| 2013/0131973 A1* | 5/2013 | Friedler | G01S 5/0263 |
| | | | 701/409 |
| 2013/0332064 A1 | 12/2013 | Funk et al. | |
| 2014/0236476 A1 | 8/2014 | Khorashadi et al. | |
| 2015/0285638 A1* | 10/2015 | Funk | G01S 19/13 |
| | | | 701/409 |
| 2016/0069690 A1* | 3/2016 | Li | G01C 21/206 |
| | | | 701/411 |
| 2016/0070265 A1 | 3/2016 | Liu et al. | |
| 2017/0064667 A1 | 3/2017 | Mycek et al. | |
| 2018/0112983 A1* | 4/2018 | Ahmed | G01C 21/30 |
| 2018/0348333 A1* | 12/2018 | Bhatti | H04W 4/025 |

OTHER PUBLICATIONS

Written Opinion of the International Searching Authority from PCT/US2017, 023200, dated Nov. 27, 2017, 8 pages.

* cited by examiner

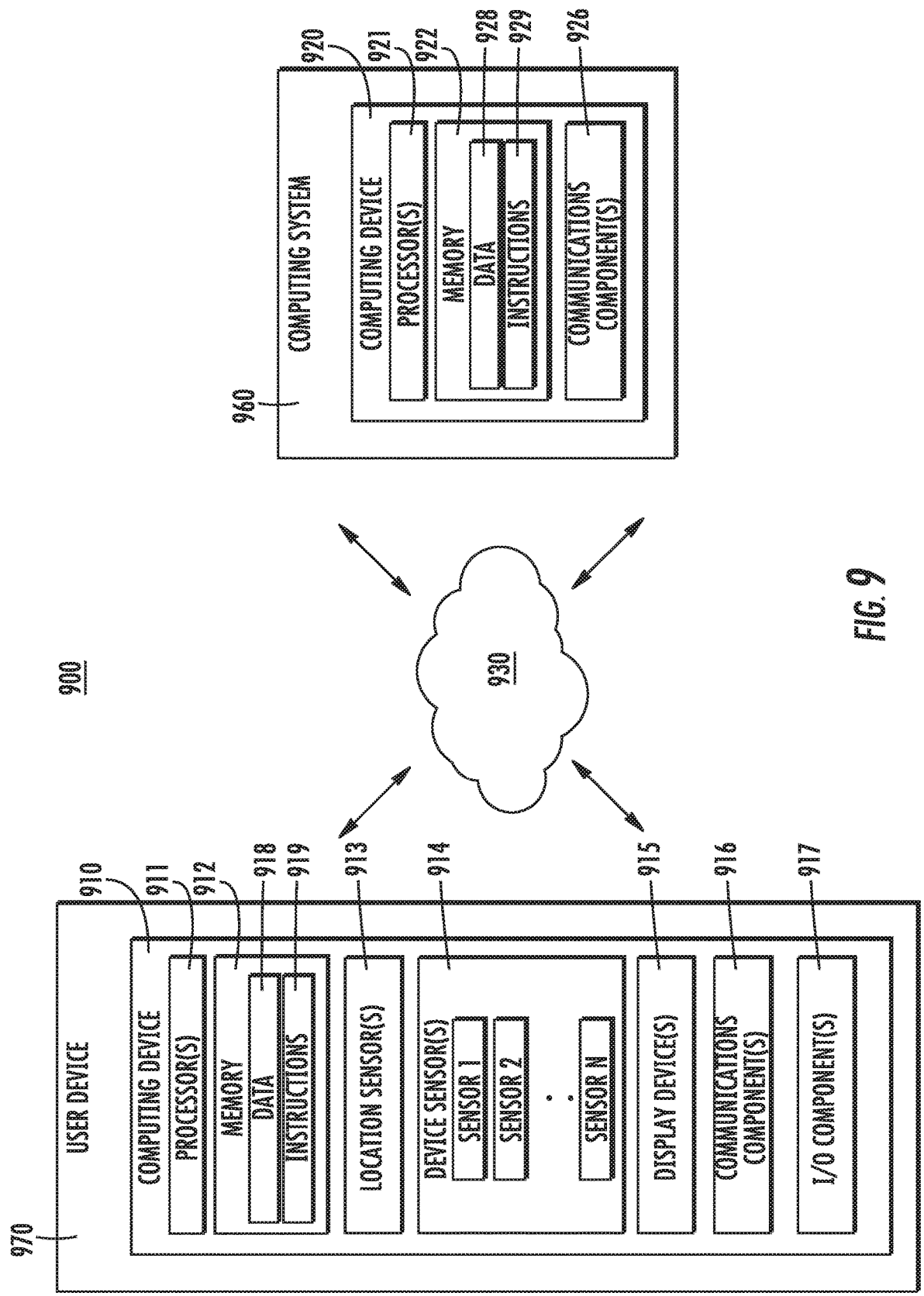

SYSTEMS AND METHODS OF DETERMINING AN IMPROVED USER LOCATION USING REAL WORLD MAP AND SENSOR DATA

PRIORITY CLAIM

The present application is a 35 USC § 371 national stage entry of International Application No. PCT/US2017/23200 having a filing date of Mar. 20, 2017. Applicant claims priority to and the benefit of such application and incorporates such application herein by reference in its entirety.

FIELD

The present disclosure relates generally to determining an improved user location using real world map data and/or sensor data. More particularly, the present disclosure relates to systems and methods that determine an improved location of a user device that corresponds to the user location, based at least in part on real world map data relating to the user device, and/or sensor data indicative of a location of the user device.

BACKGROUND

Many different techniques exist for attempting to determine a location associated with a user. For example, a location based on GPS, IP address, cell triangulation, proximity to Wi-Fi access points, proximity to beacon devices, or other techniques can be used to identify a location of a user device corresponding to the user. However, such techniques can often only determine a user's location to a certain degree of accuracy, which might be less than that desired. Without a more precise knowledge of a user device location, service providers may struggle to provide location-enhanced services, resulting in user frustration and loss of optimal functionality.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining a user device location. The method includes obtaining, by one or more computing devices, an initial estimate of a location of a user device. The method further includes obtaining, by the one or more computing devices, maps information corresponding to a geographic area at least partially surrounding the initial estimate of the location of the user device. The maps information includes one or more physical boundaries located at least in part within the geographic area at least partially surrounding the initial estimate of the location of the user device. The method further includes determining, by the one or more computing devices, a set of permissible areas that can potentially include the user device. The set of permissible areas is based at least in part on the one or more physical boundaries. The method further includes revising, by the one or more computing devices, the initial estimate of the location of the user device to provide a revised estimate for the location of the user device, based at least in part on the set of permissible areas, the revised estimate corresponding to positional coordinates of the user device.

Another example aspect of the present disclosure is directed to a computing system. The computing system includes one or more processors and one or more memory devices. The one or more memory devices store computer-readable instructions that when executed by the one or more processors cause the one or more processors to perform a method, such as the computer-implemented method described above.

Another example aspect of the present disclosure is directed to a user device. The user device includes one or more location sensors to obtain an initial estimate of a location of a user device. The user device further includes a maps application to obtain maps information corresponding to a geographic area at least partially surrounding the initial estimate of the location of the user device. The maps information includes one or more physical boundaries located at least in part within the geographic area at least partially surrounding the initial estimate of the location of the user device. The user device further includes one or more device sensors configured to provide sensor data indicative of the location of the user device. The user device further includes one or more computing devices to determine a set of permissible areas that can potentially include the user device. The set of permissible areas is based at least in part on the one or more physical boundaries and the sensor data. The user device further includes the one or more computing devices to revise the initial estimate of the location of the user device to provide a revised estimate for the location of the user device based at least in part on the set of permissible areas.

Other example aspects of the present disclosure are directed to systems, apparatus, tangible, non-transitory computer-readable media, user interfaces, memory devices, and electronic devices for determining a user device location.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which make reference to the appended figures, in which:

FIG. 9 depicts an illustrative system, in accordance with some implementations of the present disclosure.

DETAILED DESCRIPTION

Figure 1:
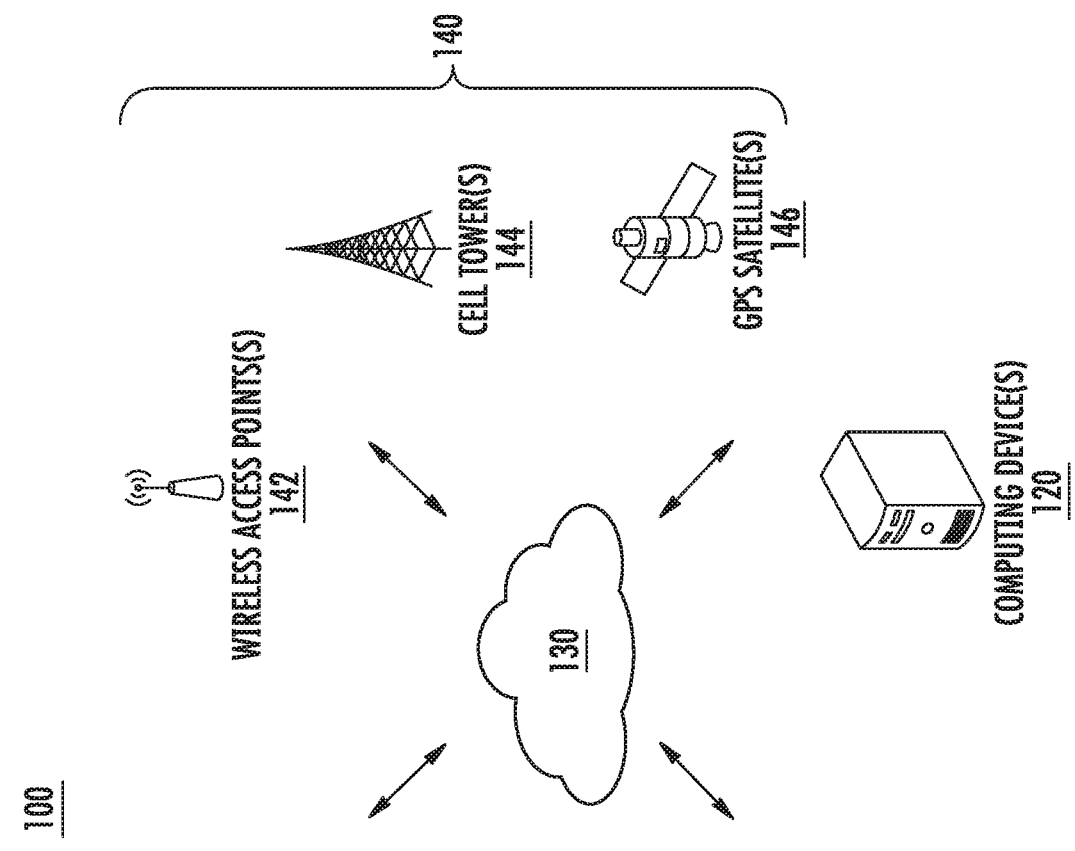
FIG. 1 depicts an illustrative system with a high level block diagram of a user device in accordance with some implementations of the present disclosure.
Figure 1:
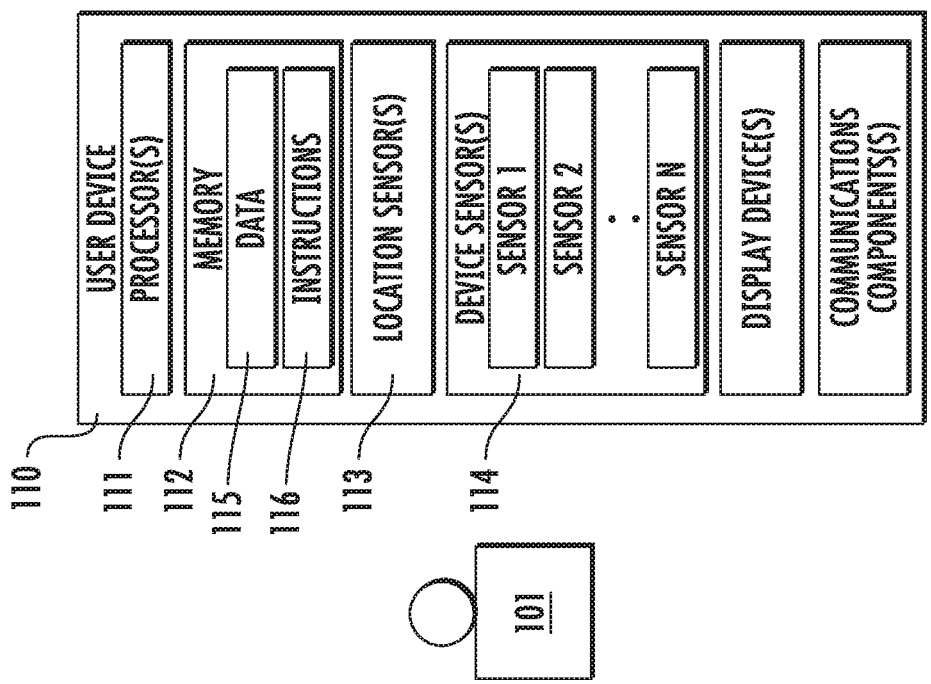

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods that provide improved determination of a location of a user device using real world map data. Map data can include, for example, maps information corresponding to a geographic area surrounding a given location (e.g., a location estimate of the user device), such as but not limited to information about one or more physical boundaries. Improved determination of a location of a user device can also be achieved using sensor data. Sensor data can include, for example, sensor information from one or more sensors provided within a user device. In some implementations, an improved estimate of a location of a user device (e.g., revised estimate) can be determined using map data, and possibly also sensor data, to revise an initial location estimate. In some implementations, a set of permissible areas that can potentially include the user device can be determined based at least in part on an initial location estimate of the user device and physical boundary information included within the map data. Subsequent determination of a location of the user device can be determined based at least in part on a previous location of the user device (e.g., a location associated with the user device at a previous time), a determined set of permissible areas, and/or sensor data indicative of the user device location (e.g., a direction and velocity of the user device). Improved determination of a location of the user device at a current and/or future time can advantageously facilitate improved navigation in mobile mapping applications and/or improved performance in other computing device applications that utilize user device location.

In accordance with one particular aspect of the present disclosure, a location estimate of a user device can include one or more approximate locations associated with the user device at a given time. An initial location estimate of a user device is a location estimate of the user device at a current time. Each approximate location associated with the user device at a given time can include data indicative of the location of the user device, such as one or more of a longitudinal position, a latitudinal position, an altitude/elevation position, etc. In some implementations, each approximate location associated with the user device at a given time can include a probability that the approximate location corresponds to the location of the user. In some implementations, the location estimate can be determined based at least in part on location data obtained by one or more location sensors provided within a user device. For example, a location estimate of a user device can be determined based on GPS coordinates of the user device obtained from a GPS system, a triangulated position of the user device calculated based on communications with cell towers, a proximity of the user device to a fixed location such as a WiFi access point or a beacon, and/or a location associated with the user device at a previous time (e.g., a previously determined improved location of a user device), etc. In some implementations, each approximate location associated with the user device at a given time can be obtained from a different location sensor. In some implementations, the location estimate can indicate whether the user is outdoors or indoors. In some implementations, the location estimate can be a probability distribution indicating a likelihood that a user device is at a particular location. For example, each of the one or more approximate locations associated with the user device included in a location estimate can include a probability that the approximate location corresponds to the location of the user device. The probability can be based on, for example, a reliability or accuracy of location data from a particular source, repetition or clustering among the one or more approximate locations with respect to each other, etc.

According to another particular aspect of the present disclosure, maps information can include data associated with a geographic area surrounding a location estimate of a user device. The geographic area can refer to an outdoor area, an indoor area, or both. In some implementations, the geographic area at least partially surrounds the location estimate of the user device. The maps information can include one or more physical boundaries in the geographic area. A physical boundary can refer to anything that is descriptive of a constraint on physical movement (e.g., roads, sidewalks, buildings, fences, exterior walls, interior walls, floors, ceilings, entryways, stairs, elevators, aisles, moving walkways, barriers, obstacles, cars, projectiles, people, animals, trees, etc.). A physical boundary can be fixed or dynamic. In some implementations, the identification of a feature in the environment as comprising a physical boundary can be conditional on one or more other parameters such as, for instance, a mode of travel (e.g., walking, biking, driving, swimming, etc.). For example, a highway can be identified as comprising a physical boundary if a user is walking, but not if a user is driving a car; a river can be identified as being a physical boundary if a user is driving a car, but not if a user is swimming; a parade can be identified as comprising a physical boundary during certain hours on a certain day; a region having a high concentration of pollen can be identified as comprising a physical boundary if a user has sensitive allergies; etc.

According to another particular aspect of the present disclosure, sensor information can include information measured and/or collected by one or more device sensors (e.g., motion sensors, audio sensors, image sensors, condition sensors, etc.) provided within a user device. For example, the one or more sensors can include an accelerometer to measure acceleration of a user device, a speedometer to measure speed, a compass to measure orientation, a gyroscope to measure rotation, a barometer to measure atmospheric pressure, a thermometer to measure temperature, a magnetometer to measure magnetic fields, an infrared camera to measure infrared radiation, a Geiger counter to measure ionizing radiation, a camera to record visual images, a microphone to record audio, and/or any other instrument to measure or collect information associated with an environment of a user device.

In some implementations, systems and methods of the present disclosure can determine an improved estimate of the location of a user device (e.g., a revised estimate) by revising an initial location estimate using maps information, and possibly also sensor information. As with the initial location estimate, the revised estimate can include data indicative of the location of the user device, such as one or more of a longitudinal position, a latitudinal position, an altitude/elevation position, etc. The systems and methods can analyze maps information and/or sensor information in conjunction with the initial location estimate to determine the revised location.

In some implementations, maps information can be analyzed to determine a set of permissible areas that can potentially include a user device, based at last in part on the one or more physical boundaries in the geographic area surrounding the initial location estimate. An improved estimate of a location of the user device (e.g., a revised estimate) can be determined by revising the initial location estimate based at least in part on the set of permissible areas. For example, an initial location estimate of a user device can include one or more approximate locations associated with the user device at a current time. If any of the one or more approximate locations associated with the user device conflict with the set of permissible areas (e.g., are outside the set of permissible areas), then the conflicting one or more approximate locations are excluded from the location estimate. In some implementations, a revised estimate can be determined by increasing or decreasing a probability that a user device is at a particular location based on one or more physical boundaries. In some implementations, a probability that a user device is at a particular location can be increased or decreased based on one or more characteristics of each physical boundary. In some implementations, maps information can be analyzed to determine a set of permissible areas that can potentially include a user device. The set of permissible areas can be based, at least in part, on an initial location estimate of a user device and one or more physical boundaries in the geographic area surrounding the initial location estimate.

In some implementations, sensor information can be analyzed to determine one or more parameters that can help improve a location estimate of a user device. An improved estimate of the location of the user device (e.g., a revised estimate) can be determined by assigning a weight to a probability that a user device is at a particular location, based on a location of a user device indicated by the sensor information. For example, if an initial location estimate of a user device indicates a probability that the user device is on a street (e.g., road) and a probability that the user device is on a sidewalk adjacent to the street, sensor information can be analyzed to determine a speed and/or mode of travel of the user device. If the speed is greater than a first threshold value, then it can indicate that the user is in a moving vehicle (e.g., driving mode), therefore the probability the user device is on the street is weighted higher and the probability that the user device is on the sidewalk is weighted lower. Alternatively, if the speed is less than a second threshold, then it can indicate that the user is walking with the device (e.g., walking mode), therefore the probability the user device is on the street is weighted lower and the probability that the user device is on the sidewalk is weighted higher.

In another example, if an initial location estimate of a user device is in the vicinity of a vehicle traffic stop and pedestrian crosswalk, sensor information can be analyzed to select an orientation of the user device. If the orientation is substantially perpendicular to the direction of the road, it can indicate that the user is on foot and waiting to cross at the crosswalk. Alternatively, if the orientation is substantially parallel to the direction of the road, it can indicate that the user is in a vehicle that is stopped at the crosswalk.

In yet another example, if an initial location estimate of a user device indicates a probability that the user device is both inside a building and outside on an adjacent sidewalk, sensor information can be analyzed to determine atmospheric pressure to calculate an elevation of the user device. If the elevation is higher than ground level, then it can be determined that the user is in the building and not on the sidewalk, therefore the probability the user device is outside is weighted lower, and the probability that the user device is inside is weighted higher. As such, pressure data from a barometer or other condition sensor can be used to help determine elevation, which can be used to revise an initial location estimate of a user device.

In a similar example, sensor information can include audio sensor data. Background noise within such audio sensor data can be analyzed to help determine whether a user device is likely indoors or outdoors. For instance, if a background noise level is higher than a first threshold, then the audio sensor data can indicate that the user device is outside. If a background noise level is below a second threshold, then the audio sensor data can indicate that the user device is inside. In some implementations, audio sensor data can be analyzed to detect one or more audio signatures that indicate a location of a user device. For example, an audio signature can indicate that the user device is inside a moving car (sound profile), near a zoo (animal sounds), at a public event (words over a loudspeaker), in a department store (intercom music), etc. As such, audio sensor data can be used to help determine noise levels and/or audio signatures, which can be used to revise an initial location estimate of a user device.

Systems and methods of the present disclosure can include one or more processors and one or more memory devices to store computer-readable instructions that can be executed by the one or more processors. The instructions can cause the processor to obtain an initial location estimate corresponding to an estimated location of the user device and maps information corresponding to a geographic area at least partially surrounding the location estimate. The instructions can also optionally cause the processor to obtain sensor information from one or more sensors provided within the user device. In addition, the instructions can cause the processor to determine an improved estimate of the location of the user device (e.g., revised estimate) by revising the initial location estimate using the maps information and possibly also the sensor information.

Systems and methods of the present disclosure can include a user device (e.g., smartphone, tablet, mobile device, laptop, desktop, wearable device, etc.) that can obtain an initial location estimate corresponding to an estimated location of the user device, maps information corresponding to a geographic area surrounding the location estimate, and possibly also sensor information from one or more sensors provided within the user device. In some implementations, maps information can be stored and retrieved from a local memory of a user device. In some implementations, the maps information can be retrieved from a maps server by transmitting a request to the maps server for maps information corresponding to a geographic area surrounding the location estimate, and receiving from the maps server the requested maps information.

Further to the descriptions above, a user device can be provided with controls allowing the user to make an election as to both if and when systems, sensors, programs or features described herein can enable collection of user information (e.g., a user's current location), and if the user is sent content or communications from a server. In addition, certain data obtained by a user device can be treated in one or more ways before it is stored or used, so that personally identifiable information is removed. For example, a user's identity can be treated so that no personally identifiable information can be determined for the user. Thus, the user can have control over what information is collected at or from a user device, how that information is used, and what information is provided to the user.

The systems and methods described herein can provide a number of technical effects and benefits. Examples of these can be understood as follows. First, when employing a conventional method in which only location data is used to determine a user device location, the determined location can sometimes lack a desired level of accuracy; in a conventional method, for example, a user in a building can be determined as walking in the middle of a street based purely on location data from a user device. In contrast, by evaluating location data relative to map data in accordance with the methods and systems described herein, it is possible to obtain realistic constraints for possible user device locations as the devices are moved from one place to another. In so doing, the techniques disclosed herein can provide improved accuracy in determining user locations.

Another example technical effect and benefit of the present disclosure is improved speed for determining user device locations. In a conventional method, location data obtained using location sensors in a user device can typically be obtained at a frequency of about once every second. This level of latency can result from the time it takes to perform a new WiFi scan, receive a new GPS reading, or the like. By contrast, in accordance with techniques disclosed herein, rotation vectors or other sensor data can be determined from device sensors in a user device much more frequently (e.g., 10 times per second or more). By considering rotation vectors, other sensor data, and/or map data in addition to location data, predictions for a user device's next location can be generated on a much more frequent basis, thus resulting in a smoother predicted travel path for a user device.

Yet another example technical effect and benefit of the present disclosure is improved navigation. By having more accurate determinations of the current geographic location of a user device, a mapping application can route a user from one location to another with increased precision and efficiency. More advanced navigational options can also be afforded. For instance, a user can be navigated along specific corridors in a building (e.g., a shopping mall) so that a user can determine indoor directions directly through a mapping application without having to consult separate directories and/or non-interactive store maps.

The systems and methods described herein can also provide a technical effect and benefit of improved computer technology. More particularly, computing system performance and processing speed within user devices and mapping applications can be enhanced by improving the accuracy of determined user device location. More accurate determination of current location can improve not only the performance within mapping applications but also other applications running on a user device that use location sensor data. By providing a streamlined approach for determining location, more seamless and effective display and utilization of location data can be afforded to a user.

With reference now to the FIGS., example embodiments of the present disclosure will be discussed in further detail. FIG. 1 depicts an example system 100 for determining a location of a user device according to example embodiments of the present disclosure. The system 100 can include a user device 110 (e.g., cell phone, laptop, wearable device, etc.) that corresponds to a user 101. A location of the user device 110 can correspond to a location of a user 102. In some implementations, the system 100 can include one or more computing devices 120, and/or one or more signal sources 140. The signal source(s) 140 can include, for example, one or more wireless access points 142, cell towers 144, GPS satellites 146, and other signal source types. In some implementations, the user device 110, computing device(s) 120, and/or the signal source(s) 140 can communicate with each other over a network 130, as described herein (e.g., wireless communication network, other network).

The computing device(s) 120 can include, for example, one or more servers that are remote from the user device 110. The computing device(s) 120 can include various components for performing various operations and functions. For example, and as further described herein, the computing device(s) 120 can store instructions that when executed by one or more processors cause the one or more processor to perform the operations and functions, for example, as those described herein for determining an improved user location. The computing device(s) 120 can be, for instance, associated with a server system (e.g., a cloud-based server system).

In some implementations, the user device 110 can include one or more processors 111 and a memory 112. The memory 112 can store data 115 (e.g., a location history, a location history window, etc.) and/or computer readable instruction(s) 116. In some implementations, the user device 110 can include one or more location sensor(s) 113 (e.g., GPS, cell radio, WiFi radio, etc.), device sensor(s) 114 (e.g., accelerometer, speedometer, compass, gyroscope, barometer, thermometer, magnetometer, infrared camera, Geiger counter, camera, microphone, etc.), and display device(s) 115 (e.g., a display screen).

The signal source(s) 140 can transmit location data, and the user device 110 can obtain the location data via the location sensor(s) 113. In some implementations, the signal source(s) 140 can transmit location data in response to a request from the user device 110. The user device 110 can determine an initial location estimate (e.g., one or more approximate locations associated with the user device at a current time) based at least in part on the location data received from one or more signal source(s) 140.

Figure 2A:
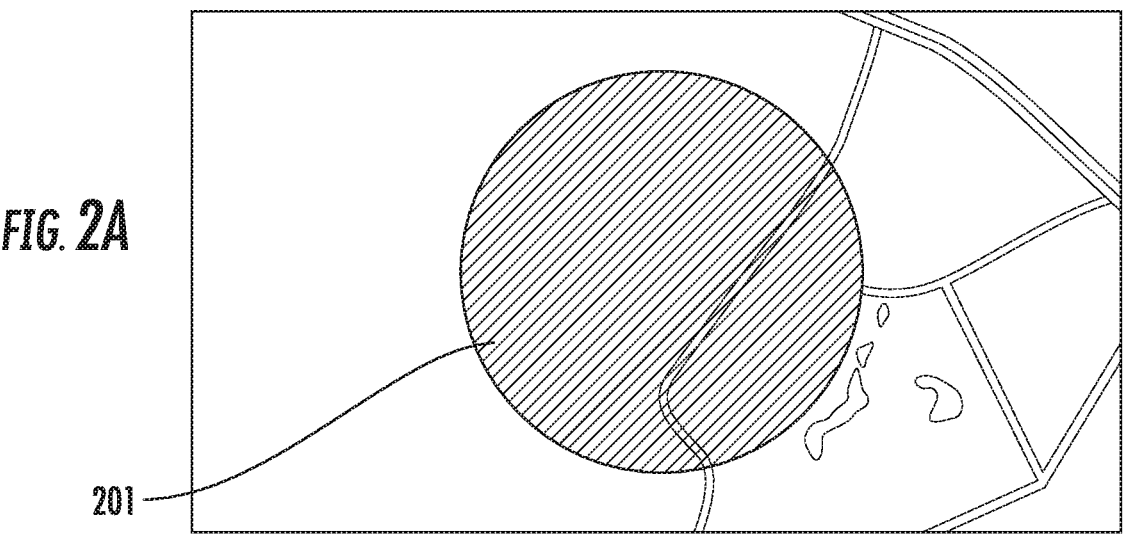
FIGS. 2A-2C depict example views of maps information showing a geographic area surrounding a given location in accordance with some implementations of the present disclosure.
Figure 2B:
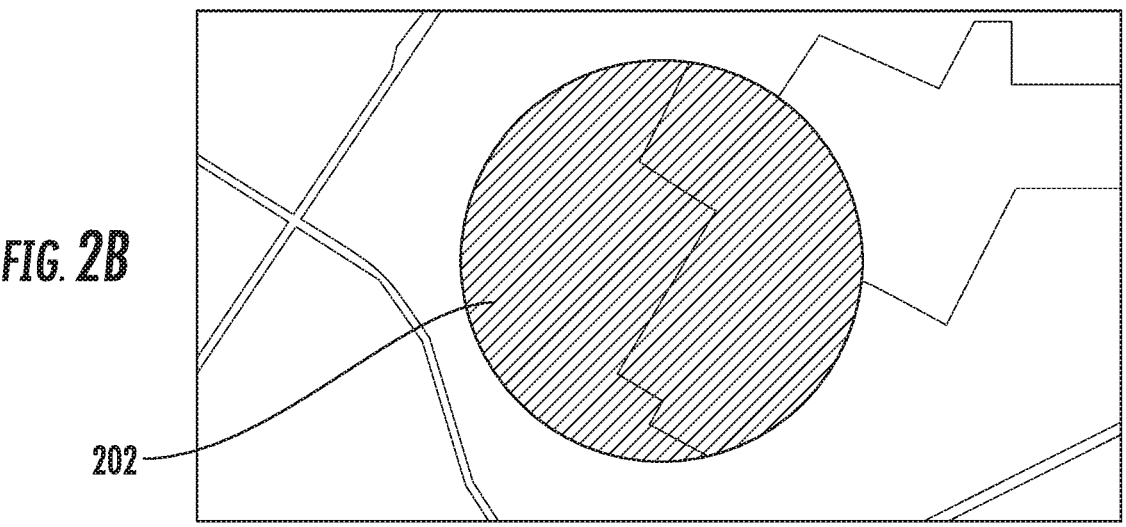
Figure 2C:
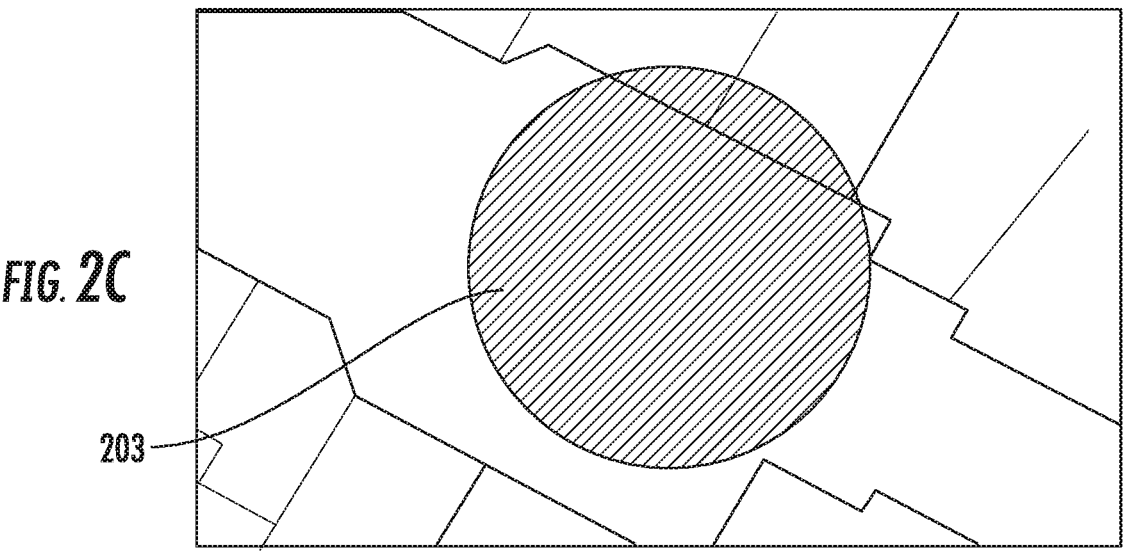

FIGS. 2A-2C depict example views of maps information showing a geographic area surrounding a given location (e.g., a location estimate of a user device). FIG. 2A depicts an example view of maps information showing an outdoor geographic area surrounding the location estimate 201. FIG. 2B depicts an example view of maps information showing an outdoor and indoor geographic area surrounding the location estimate 202. FIG. 2C depicts an example view of maps information showing an indoor geographic area surrounding the location estimate 203.

Figure 3A:
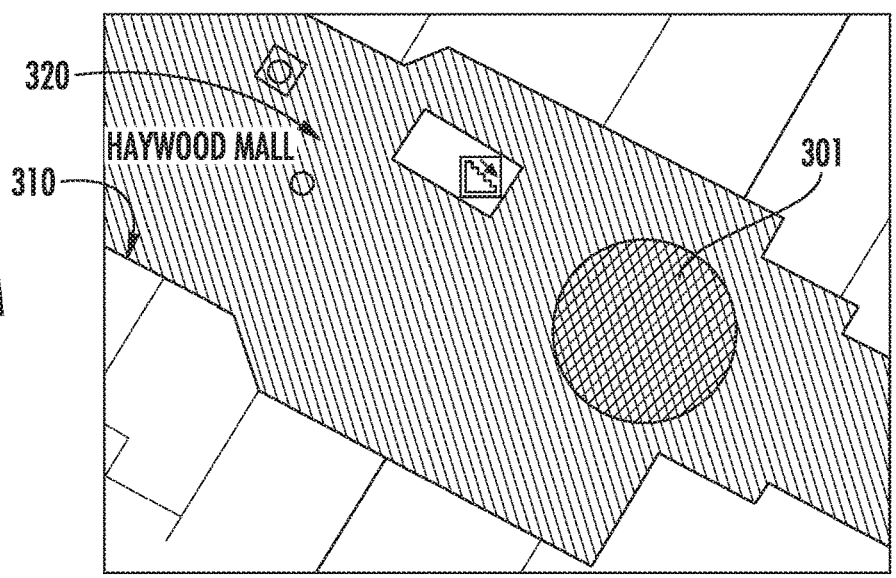
FIGS. 3A-3C depict example views of determining an improved location of a user device in accordance with some implementations of the present disclosure.
Figure 3B:
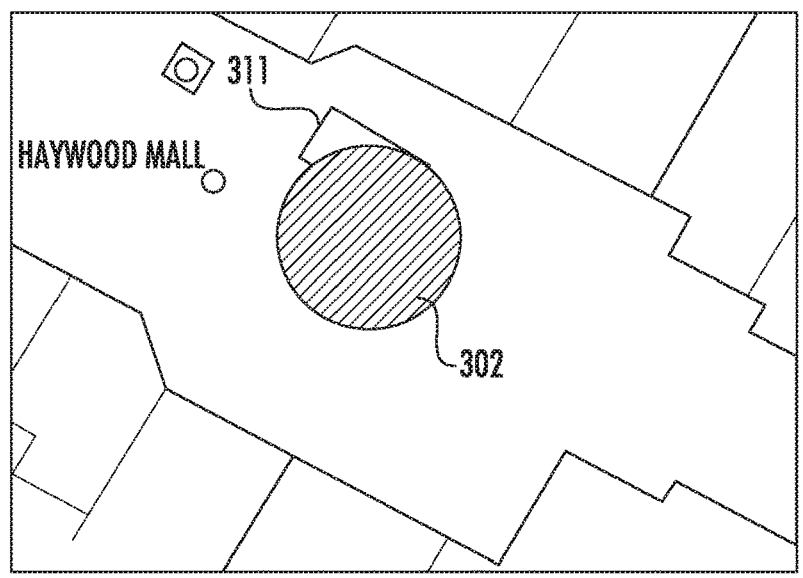
Figure 3C:
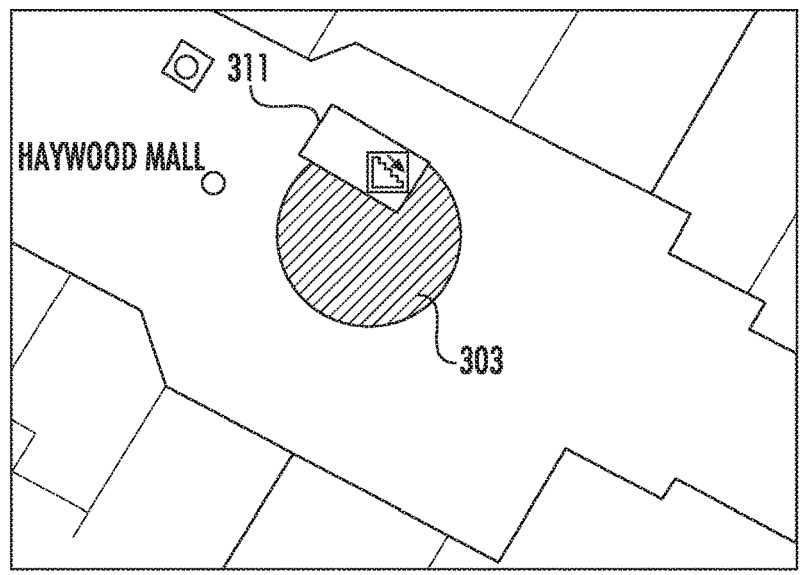

FIGS. 3A-3C depict example views of determining an improved location of a user device in accordance with some implementations of the present disclosure. FIG. 3A depicts an example view of maps information showing an indoor geographic area surrounding a location estimate 301 of a user device. The location estimate 301 can include one or more approximate locations associated with the user device represented by the area within the location estimate 301. Each of the approximate locations can be include a probability that the approximate location corresponds to the location of the user device. The geographic area includes one or more physical boundaries 310 (e.g., walls, stairwells, stores, carts, other people, etc.). The user device can determine a set of permissible areas 320 based at least in part on the one or more physical boundaries 310. The user device can revise the location estimate 301 of the user device based at least in part on the set of permissible areas 320 to provide a revised estimate. In FIG. 3A, the set of permissible areas 320 do not conflict with the location estimate 301 since the location estimate 301 is contained within the set of permissible areas 320. In this case, the improved location of the user device can be the same as the location estimate 301. FIG. 3B depicts an example view of the set of permissible areas 320 conflicting with the location estimate 302 of the user device. For example, a user carrying the user device can move next to a stairwell 311. Even if the user remains on the same floor, the location estimate 302 indicates a non-zero probability that the user device is outside the set of permissible areas 320 (e.g., floating in midair in the stairwell 311). In this case, the user device can revise the location estimate 302 based at least in part on the set of permissible areas 320 to provide a revised estimate 303 of the user device. FIG. 3C depicts an example view of the revised estimate 303 that excludes the one or more approximate locations associated with the user device that are outside the set of permissible areas 320. For example, the user device can revise the location estimate 303 by zeroing the probability that the user device is in the stairwell 311. In another example, the user device can revise the location estimate 303 by lowering the probability of each approximate location that is outside the set of permissible areas 320 to below a threshold value.

Figure 4A:
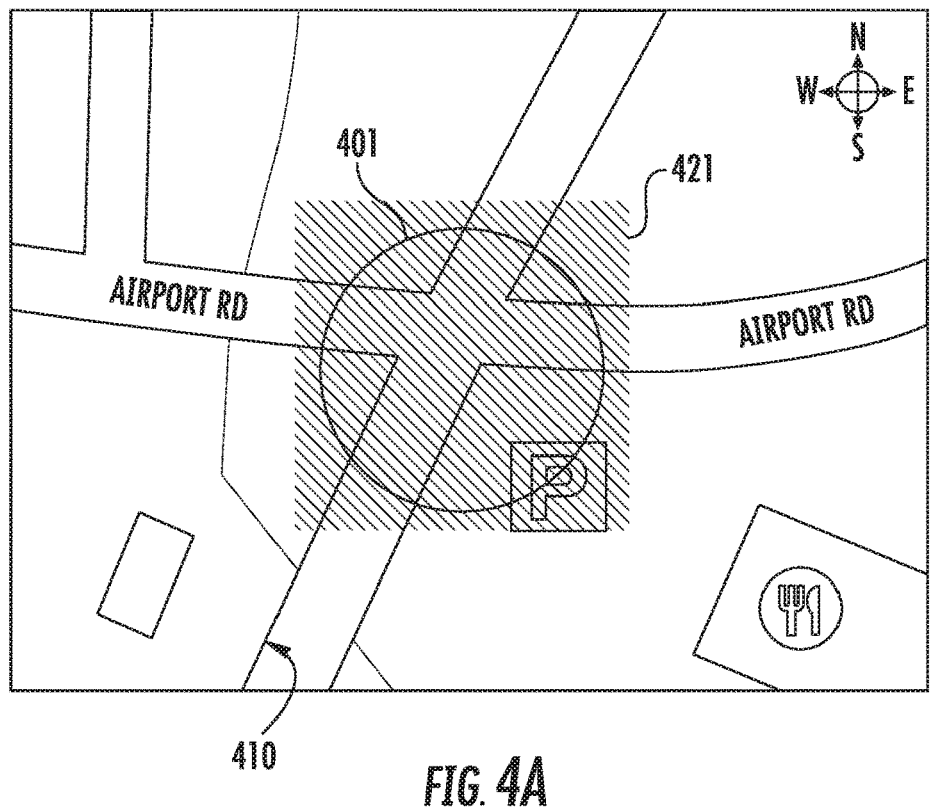
FIGS. 4A-4E depict example views of determining a set of permissible areas in accordance with some implementations of the present disclosure.
Figure 4B:
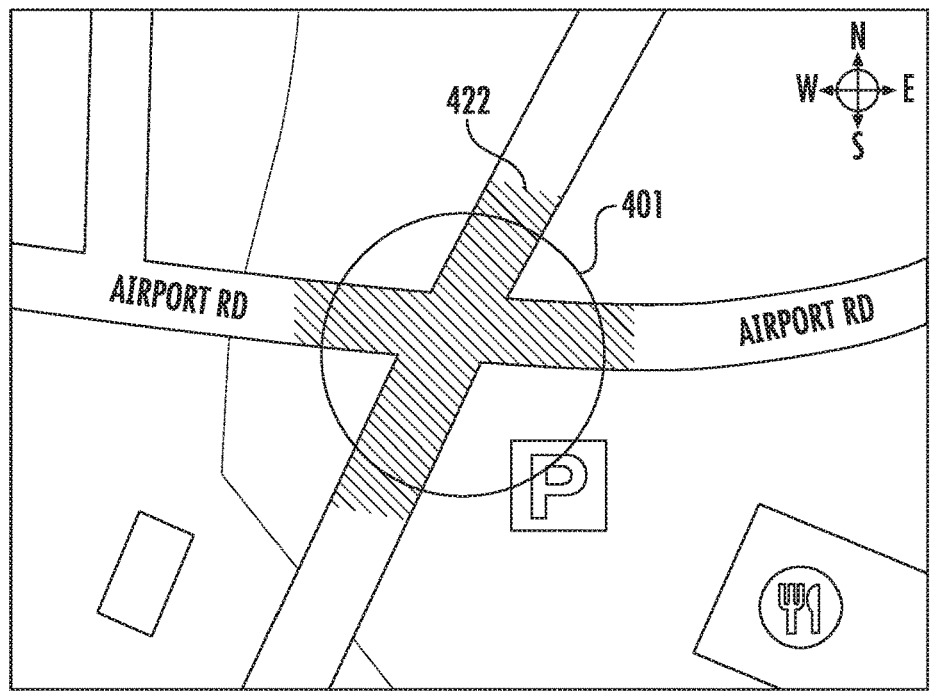
Figure 4C:
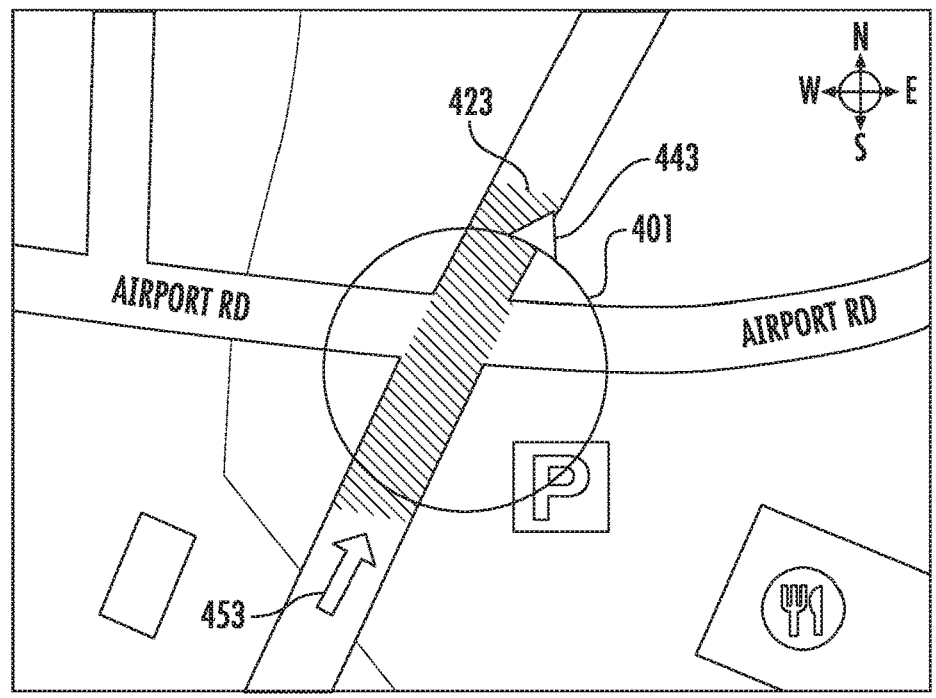
Figure 4D:
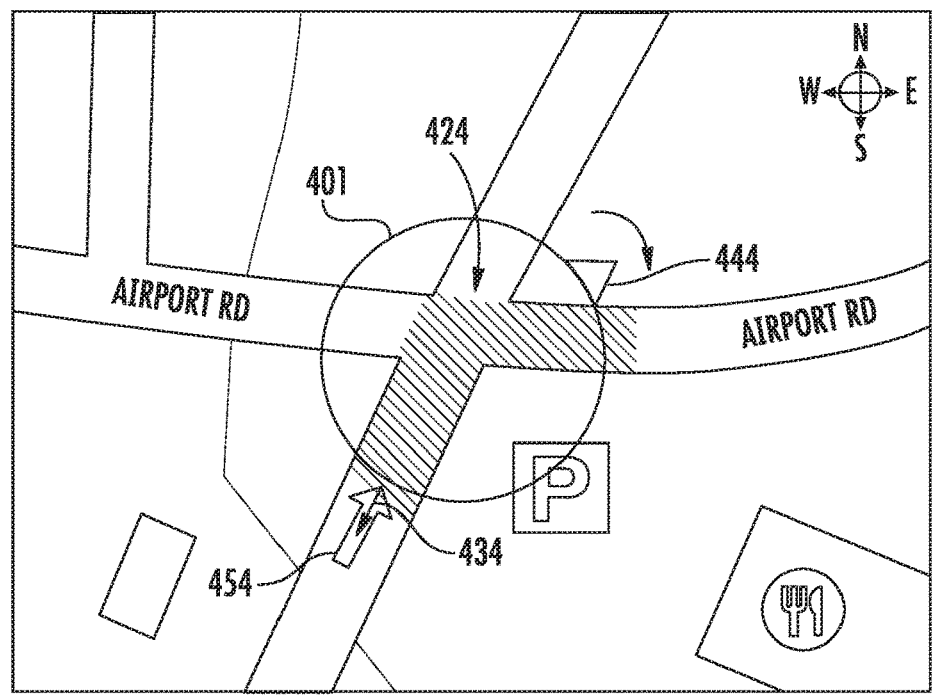
Figure 4E:
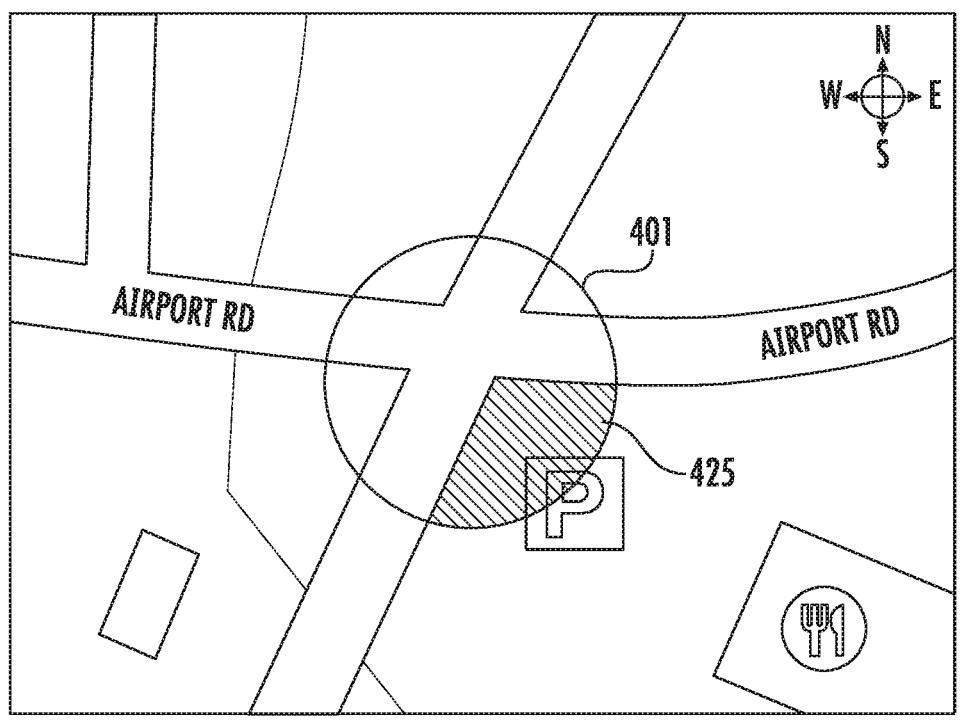

FIGS. 4A-4E depict example views of determining a set of permissible areas in accordance with some implementations of the present disclosure. FIG. 4A depicts an example view of maps information showing a geographic area surrounding a location estimate 401 of a user device. The location estimate 401 indicates that the user device is at an intersection with a probability distribution that includes the two intersecting roads and the surrounding area. The geographic area includes one or more physical boundaries 410 (e.g., roads, creeks, other cars, etc.). The user device can determine a set of permissible areas 421 based at least in part on the one or more physical boundaries 410, as described above with respect to FIGS. 3A-3C. Additionally, the user device can obtain sensor data from one or more sensors provided within the user device (e.g., speed, direction, rotation, etc.) and determine a set of permissible areas based at least in part on the one or more physical boundaries 410 and the sensor data. FIG. 4B, for example, depicts a view where the user device obtains sensor data (e.g., from an accelerometer, gyroscope, or other motion sensor capable of measuring speed or velocity) indicative of the user device travelling at a high speed. Based on the sensor data, the user device can determine a mode of travel as driving mode and determine the set of permissible areas 422 by increasing a probability that the user device is on a road, and/or decreasing a probability that the user device is in the area surrounding the road, as shown. FIG. 4C, for example, depicts a view where the user device obtains sensor data (e.g., from an accelerometer, gyroscope, magnetometer, etc. capable of measuring speed or velocity as well as orientation or rotation) indicative of the user device with orientation 443 in a north-east direction and travelling at a high speed 453 (e.g., driving mode) in a north-east direction substantially parallel to the road. Based on the sensor data, the user device can determine the set of permissible areas 423 by increasing a probability that the user device is on the road substantially parallel to the orientation 443, and/or decreasing a probability that the user device is on the road substantially perpendicular to the orientation 443, as shown. FIG. 4D, for example, depicts a view where the user device obtains sensor data indicative of the user device travelling at a high speed 454 (e.g., driving mode) in a north-east direction, a deceleration 434 in a south-west direction, and a clockwise rotation of the orientation 444. Based on the sensor data, the user device can determine the set of permissible areas 424 by decreasing a probability that the user device has crossed the intersection in a north-east direction of travel, and/or increasing a probability that the user device is located in the direction of the orientation 444, as shown. FIG. 4E, for example, depicts a view where the user device obtains sensor data indicative of the user device travelling at low to no speed. Based on the sensor data, the user device can determine a mode of travel as walking-mode and determine the set of permissible areas 425 by increasing a probability that the user device is at a nearby parking lot, and/or decreasing a probability that the user device is on a road.

FIGS. 5-8 depict flow diagrams of example methods for improved determination of user device location, according to example embodiments of the present disclosure. The methods can be implemented by one or more computing devices, such as the user device 110 or computing device(s) 120 depicted in FIG. 1. Moreover, one or more portion(s) of the methods can be implemented as an algorithm on the hardware components of the device(s) described herein (e.g., as in FIG. 1) to, for example, determine an improved user device location. FIGS. 5-8 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

Figure 5:
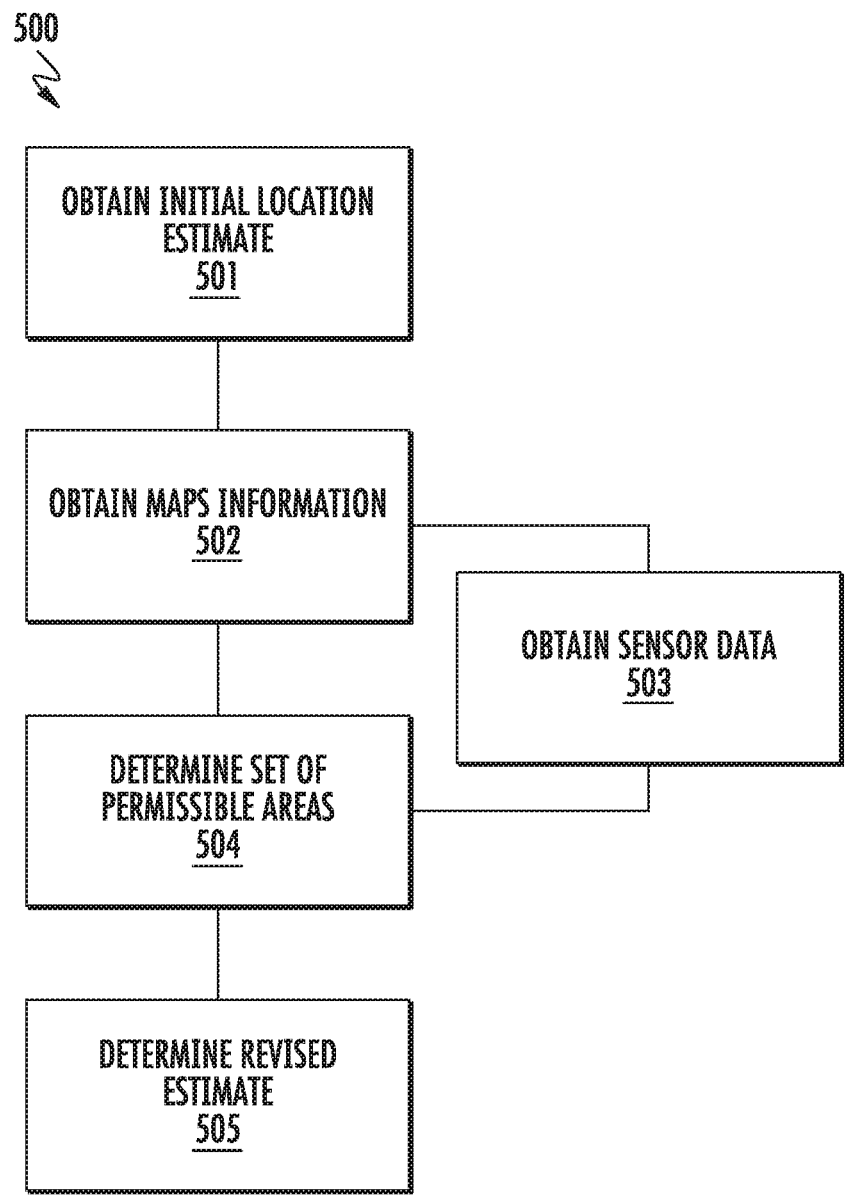
FIG. 5 depicts a flow diagram of illustrative steps for improved determination of user device location in accordance with some implementations of the present disclosure.

FIG. 5 depicts a flow diagram of an example method 500 for improved determination of user device location, according to example embodiments of the present disclosure. At (501), the method 500 can include obtaining an initial location estimate of a user device. In some implementations, a user device can determine the initial location estimate based at least in part on location data from one or more location sensors within the user device. For example, the location sensor(s) 113 in user device 110 of FIG. 1 can receive location data transmitted by the signal source(s) 140. In some implementations, a user device can determine the initial location estimate based at least in part on a previous location of the user device. For example, the user device 110 can store a previously determined location of the user device in memory 112. In some implementations, the initial location estimate of a user device obtained at (501) can include a plurality of approximate locations associated with the user device at a given time. In some implementations, each of the plurality of approximate locations associated with the user device is obtained from a different source (e.g., one of the different signal sources 140 in FIG. 1).

At (502), the method 500 can include obtaining maps information corresponding to a geographic area surrounding the initial location estimate of the user device. In some implementations, the user device 110 can transmit the initial location estimate to a maps server (e.g., computing device(s) 120), and receive maps information from the maps server. In some implementations, the user device 110 can retrieve maps information previously stored in memory 112. The maps information can include one or more physical boundaries located at least in part within the geographic area surrounding the initial location estimate of the user device. Physical boundaries included within the maps information obtained at (502) can include, for example, one or more exterior building walls, interior building walls, fences, barriers, or other physical boundaries restricting movement of the user device within the geographic area at least partially surrounding the user device. Examples of maps information including one or more physical boundaries obtained at (502) are variously depicted, for example in FIGS. 2A-2C, FIGS. 3A-3C, and FIGS. 4A-4E.

At (503), the method 500 can include obtaining sensor data from one or more sensors provided within a user device. The sensor data can include information indicative of a condition associated with an environment of the user device. For example, the sensor data can include a speed, acceleration, rotation, translation, direction, orientation, and/or elevation of the user device or data from other motion sensors. In other examples, the sensor data can include audio sensor data, image data, atmospheric pressure data, or data from other condition sensors.

At (504), the method 500 can include determining a set of permissible areas that can potentially include the user device. In some implementations, the method 500 can determine the set of permissible areas based at least in part on one or more physical boundaries included in the maps information obtained at (502). For example, the user device 110 can determine the set of permissible areas to include some physical boundaries (e.g., sidewalks) and exclude some physical boundaries (e.g., rooftops of skyscrapers). In some implementations, the method 500 can determine the set of permissible areas based at least in part on one or more physical boundaries included in the maps information obtained at (502) and optionally based on sensor data obtained at (503). For example, if the sensor data indicates that the user device is moving at a low speed, the user device 110 can determine the set of permissible areas to include sidewalks and exclude roadways. As another example, if the sensor data indicates that the user device is moving at a high speed, the user device 110 can determine the set of permissible areas to include roadways and exclude sidewalks. As yet another example, if the sensor data indicates that the user device is at an elevation of fifty floors, the user device 110 can determine the set of permissible areas to exclude street-level portions of a geographic area and associated physical boundaries and include portions of a geographic area and associated physical boundaries within the fiftieth floor of a nearby building.

At (505), the method 500 can include determining an improved user device location (e.g., a revised estimate). Similar to the initial location estimate, the revised location estimate determined at (505) can correspond to positional coordinates of the user device (e.g., one or more of a longitudinal position, a latitudinal position, an altitude/elevation position, etc.) The revised estimate determined at (505) can be based at least in part on the set of permissible areas that can potentially include the user device as determined at (504). For example, the user device 110 can determine if any of the one or more approximate locations associated with the user device at a current time (e.g., initial location estimate obtained at 501) conflict with the set of permissible areas determined at (504). The user device 110 can remove the conflicting approximate locations from among the one or more approximate locations associated with the user device (e.g., initial location estimate) to determine a revised estimate at (505). In some examples, permissible areas determined at (504) can include portions of a geographic area that are either inside a building or outside a building such that the revised estimate determined at (505) can include data indicative of whether the user device 110 is inside a building or outside a building. In some implementations, the positional coordinates of the revised location estimate can be provided for display on a display device included in or otherwise associated with the user device.

Figure 6:
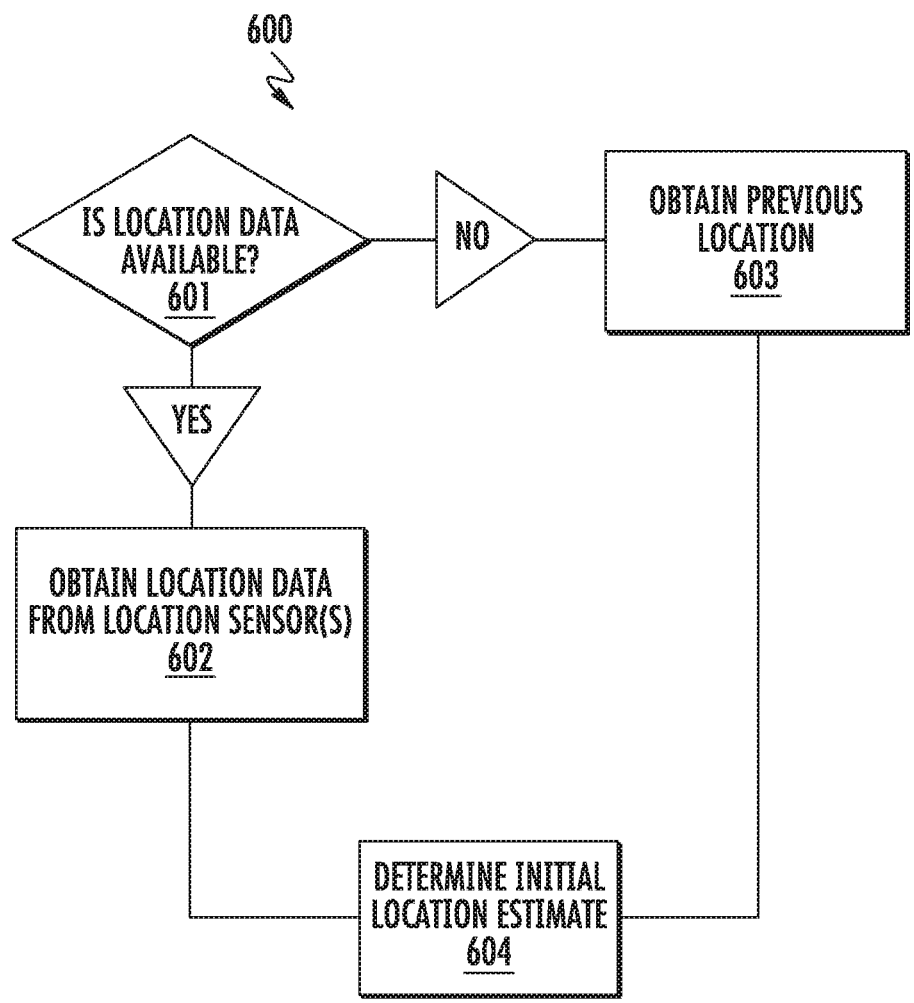
FIG. 6 depicts a flow diagram of illustrative steps for obtaining an initial location estimate of a user device in accordance with some implementations of the present disclosure.

FIG. 6 depicts a flow diagram of an example method 600 for obtaining an initial location estimate of a user device, according to example embodiments of the present disclosure. For example, some or all of method 600 can be performed in some implementations of obtaining an initial location estimate at (501) in FIG. 5. At (601), the method 600 can determine if location data is available. For example, if the location sensor(s) 113 of user device 110 in FIG. 1 cannot receive location data from the signal source(s) 140, or if the signal source(s) 140 cannot transmit location data to the user device 110 for any reason, then the user device 110 can determine that the location data is not available. As another example, if the user device 110 receives location data that is unusable to determine an initial location estimate (e.g., a location estimate at a current time) of the user device, then the user device 110 can determine that the location data is not available.

At (602), if the location data is available, the method 600 can obtain the location data from one or more location sensors within the user device.

At (603), if the location data is not available, the method 600 can obtain a previous location of the user device. For example, if the user device 110 obtains a location estimate at a time T-1, then the user device 110 can determine the location estimate at time T-1 as the previous location of the user device. In another example, if the user device 110 determines a revised estimate at time T-1, then the user device can determine the revised estimate at time T-1 as the previous location of the user device.

At (604), the method 600 determines the initial location estimate of the user device. For example, the user device 110 can determine the initial location estimate at (604) based at least in part on location data obtained at (602) by one or more location sensors within a user device from one or more signal source(s) 140 and/or based at least in part on a previous location of the user device obtained at (603).

Figure 7:
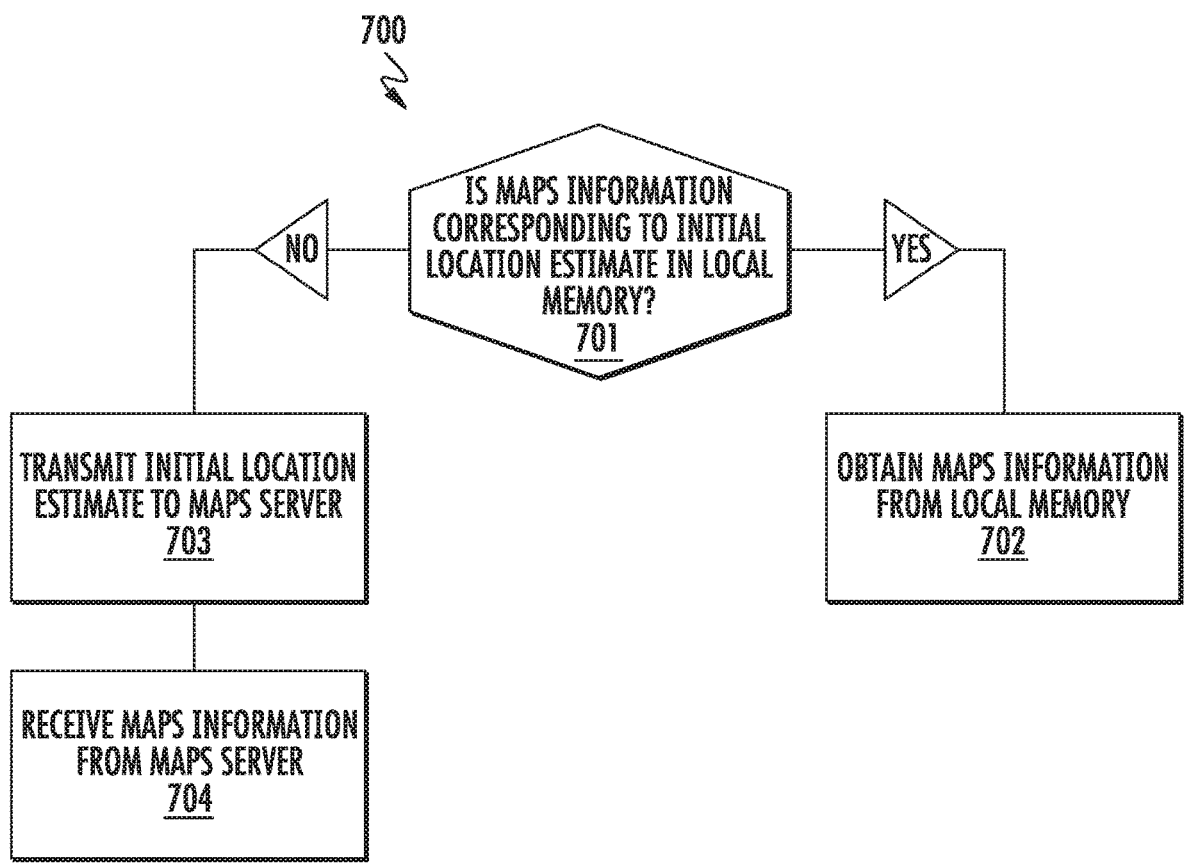
FIG. 7 depicts a flow diagram of illustrative steps for obtaining maps information in accordance with some implementations of the present disclosure.

FIG. 7 depicts a flow diagram of an example method 700 for obtaining maps information corresponding to a geographic area surrounding an initial location estimate of a user device, according to example embodiments of the present disclosure. For example, some or all of method 700 can be performed in some implementations of obtaining maps information at (502) in FIG. 5. At (701), the method 700 can determine if the maps information corresponding to the geographic area surrounding the initial location estimate of the user device in stored in local memory. For example, the user device 110 of FIG. 1 can store maps information obtained at a previous time in the memory 112. The user device 110 can later retrieve and use the maps information stored in the memory 112.

At (702), if the maps information is determined to be stored in local memory, the method 700 can obtain the maps information from the memory 112.

At (703), if the maps information is determined not to be stored in local memory, the method 700 can transmit the initial location estimate to a maps server.

At (704), the method 700 can obtain the maps information from the maps server.

Figure 8:
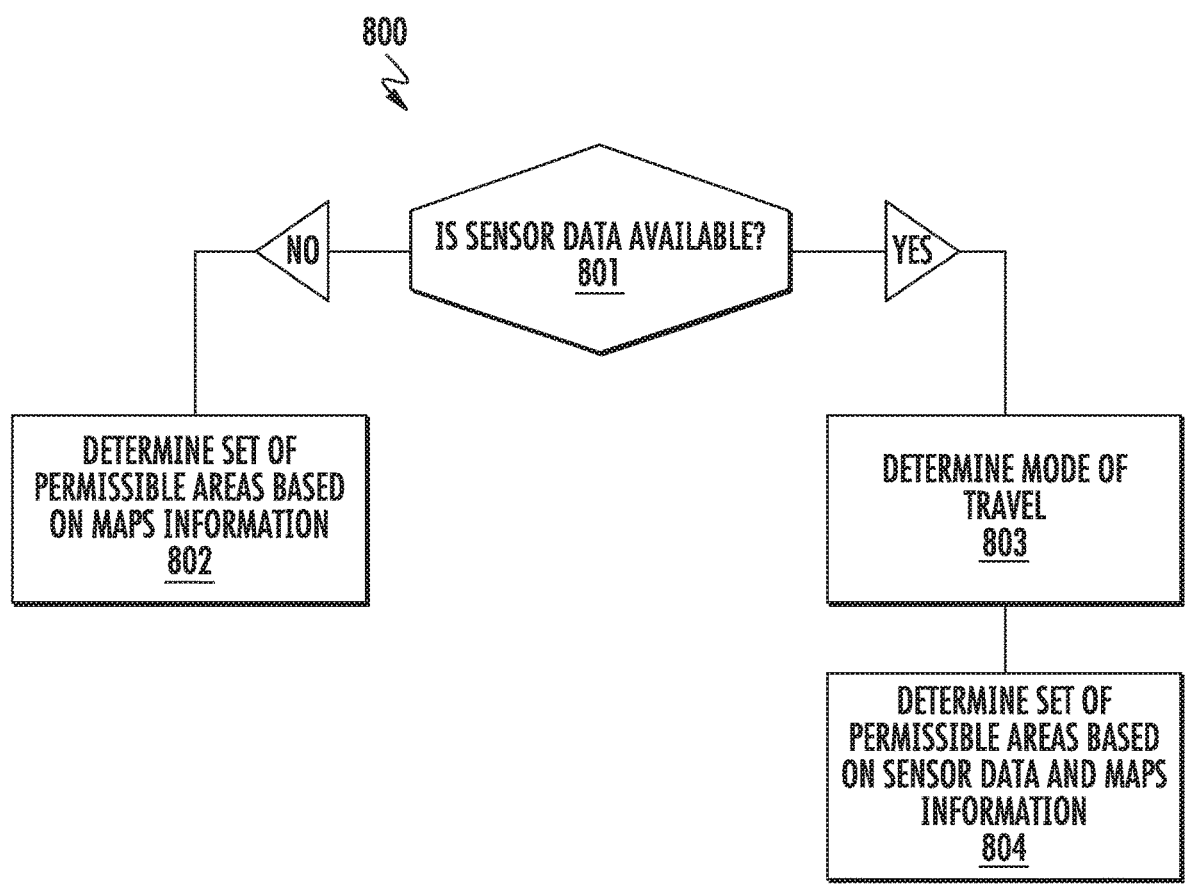
FIG. 8 depicts a flow diagram of illustrative steps for determining a set of permissible areas in accordance with some implementations of the present disclosure.

FIG. 8 depicts a flow diagram of an example method 800 for determining a set of permissible areas that can potentially include a user device, according to example embodiments of the present disclosure. For example, some or all of method 800 can be performed in some implementations of determining a set of permissible areas at (504) in FIG. 5. At (801), the method 800 can determine if sensor data is available. For example, if the device sensor(s) 114 of user device 110 in FIG. 1 cannot obtain sensor data for any reason, or if the user device 110 receives sensor data that is unusable, then the user device 110 can determine that the sensor data is not available.

At (802), if the sensor data is not available, the method 800 can determine the set of permissible areas based at least in part on maps information obtained at (502). For example, the user device 110 can obtain maps information that includes one or more physical boundaries such as a road and a sidewalk. The user device 110 can determine the set of permissible areas as including either the road or the sidewalk, and not both.

At (803), if the sensor data is available, the method 800 can determine a mode of travel based at least in part on the sensor data. For example, if the sensor data indicates that the user device is travelling at a high speed (e.g., above a first threshold value), the user device 110 can determine that the mode of travel is a driving mode. As another example, if the sensor data indicates that the user device 110 is travelling at a low speed (e.g., below a second threshold value), the user device can determine that the mode of travel is a walking mode.

At (804), the method 800 can determine the set of permissible areas based at least in part on the sensor data obtained at (503) and maps information obtained at (502). For example, if the sensor data indicates that the user device 110 is travelling at a high speed (e.g., driving mode) and experiences an acceleration in the direction of travel, then the user device 110 can determine that the set of permissible areas is a road in front of the user device 110. As another example, if the sensor data indicates that the user device 110 is not moving but is at an elevation of fifty floors, then the user device can determine the set of permissible areas as a nearby office building that is at least fifty floors high. As yet another example, the location estimate 202 in FIG. 2B indicates a non-zero probability that a user device is outside a building and a non-zero probability that the user device is inside a building. In this case, the user device can obtain audio sensor data to determine a background noise of the user device. If the background noise is above a certain level, or if the background noise includes outdoor sounds (e.g., birds, cars, etc.), then the user device can determine the set of permissible areas based at least in part by excluding locations that are indoors. If the background noise is within a certain range, or if the background noise includes indoor sounds (e.g., elevator music, people's conversations, etc.), then the user device can determine the set of permissible areas based at least in part by excluding locations that are outdoors.

FIG. 9 depicts an example computing system 900 that can be used to implement the systems and methods according to example aspects of the present disclosure. The system 900 can be implemented using a client-server architecture that includes the computing system 960 (e.g., including one or more servers) that communicates with one or more user devices 910 over a network 930. The system 900 can be implemented using other suitable architectures, such as a single computing device.

The system 900 includes the computing system 960 that can include, for instance, a web server and/or a cloud-based server system. The computing system 960 can be implemented using any suitable one or more computing devices 920. The computing device 920 can have one or more processors 921 and one or more memory 922. The computing device 920 can also include communications component(s) 926 used to communicate with one or more other component of the system 900 (e.g., one or more user devices 910) over the network 930. The communications component(s) 926 can include any suitable components for interfacing with one more networks, including for example, transmitters, receivers, ports, controllers, antennas, or other suitable components.

The one or more processors 921 can include any suitable processing device, such as a microprocessor, microcontroller, integrated circuit, logic device, or other suitable processing device. The memory 922 can include one or more computer-readable media, including, but not limited to, non-transitory computer-readable media, RAM, ROM, hard drives, flash drives, or other memory devices. The memory 922 can store information accessible by the one or more processors 921, including computer-readable instructions 929 that can be executed by the one or more processors 921. The instructions 929 can be any set of instructions that when executed by the one or more processors 921, cause the one or more processors 921 to perform operations. In some embodiments, the instructions 929 can be executed by the one or more processors 921 to cause the one or more processor 921 to perform operations, such as any of the operations and functions for which the computing system 960 and/or the computing devices 920 are configured, the operations for improved determination of user device location (e.g., methods 500, 600, 700), as described herein, and/or any other operations or functions of the computing system 960 and/or the computing devices 920. The instructions 929 can be software written in any suitable programming language or can be implemented in hardware. Additionally, and/or alternatively, the instructions 929 can be executed in logically and/or virtually separate threads on processor 921.

As shown in FIG. 9, the memory 922 can also store data 928 that can be retrieved, manipulated, created, or stored by the one or more processors 921. The data 928 can include, for instance, data associated with determining an improved location of the user device and/or other data or information. The data 928 can be stored in one or more databases. The one or more databases can be connected to the computing device 920 by a high bandwidth LAN or WAN, or can also be connected to computing devices 920 through network 930. The one or more databases can be split up so that they are located in multiple locales.

The computing device 920 can exchange data with one or more user devices 910 over the network 930. Although one user device 970 is illustrated in FIG. 9 (and herein), any number of user devices 910 can be connected to computing devices 920 over the network 930. Each of the user devices 910 can be any suitable type of computing device, such as a general purpose computer, special purpose computer, laptop, desktop, mobile device, navigation system, smartphone, tablet, wearable computing device, a display with one or more processors, or other suitable computing device.

A user device 970 can include one or more computing devices 910. The one or more computing devices 910 can include one or more processors 911 and memory 912. The one or more processors 911 can include one or more central processing units (CPUs), graphics processing units (GPUs) dedicated to efficiently rendering images or performing other specialized calculations, and/or other processing devices. The memory 912 can include one or more computer-readable media and can store information accessible by the one or more processors 911, including instructions 919 that can be executed by the one or more processors 911 and data 918. For instance, the memory 912 can store instructions 919 for improved determination of user device location, according to example aspects of the present disclosure. In some embodiments, the instructions 919 can be executed by the one or more processors 911 to cause the one or more processor 911 to perform operations, such as any of the operations and functions for which the user device 970 is configured, as described herein, and/or any other operations or functions of the user device 970. The instructions 919 can be software written in any suitable programming language or can be implemented in hardware. Additionally, and/or alternatively, the instructions 919 can be executed in logically and/or virtually separate threads on processors 911.

The user device 970 of FIG. 9 can include various input and/or output component(s) 917 for providing and receiving information from a user, such as a touch screen, touch pad, data entry keys, speakers, and/or a microphone suitable for voice recognition. The user device 970 can also include various output component(s). For instance, the user device 970 can have one or more microphones for obtaining audio sensor data according to example aspects of the present disclosure. The user device 970 can also include speakers, etc. Additionally, and/or alternatively, the user device 970 can include one or more location sensors 913 and/or one or more device sensors 914 associated with the user device 970, as described herein.

The user device 970 can also include one or more communications components 916 to communicate with one or more other components of system 900 (e.g., computing system 960) over the network 930. The communications components 916 can include any suitable components for interfacing with one more networks, including for example, transmitters, receivers, ports, controllers, antennas, or other suitable components.

The network 930 can be any type of communications network, such as a local area network (e.g., intranet), wide area network (e.g., Internet), cellular network, or some combination thereof. The network 930 can also include a direct connection between a user device 970 and the computing system 960. In general, communication between computing system 960 and a user device 970 can be carried via network interface using any type of wired and/or wireless connection, using a variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a computing device that is remote from the user device (e.g., a server system) can instead be performed at a user device. Likewise, computing tasks discussed herein as being performed at the user device can instead be performed at computing device that is remote from the user device (e.g., a server system).

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for determining a user device location, comprising:
    obtaining, by one or more computing devices, an initial estimate of a location of a user device;
    obtaining, by the one or more computing devices, maps information corresponding to a geographic area at least partially surrounding the initial estimate of the location of the user device, the maps information including one or more physical boundaries located at least in part within the geographic area at least partially surrounding the initial estimate of the location of the user device, wherein the maps information associates features within an environment of the user device as being conditioned on one or more other parameters including a mode of travel such that a first feature is incompatible with a first mode of travel and a second feature is incompatible with a second mode of travel;
    obtaining, by the one or more computing devices, sensor data from one or more sensors provided within the user device;
    determining, by the one or more computing devices, the mode of travel based on the sensor data;
    determining, by the one or more computing devices, a set of permissible areas that can potentially include the user device, wherein the set of permissible areas is determined based at least in part on the one or more physical boundaries and at least in part on the mode of travel such that when the mode of travel is determined to be the first mode of travel, permissible areas corresponding to the first feature are excluded from the set of permissible areas and when the mode of travel is determined to be the second mode of travel, permissible areas corresponding to the second feature are excluded from the set of permissible areas;
    determining, by the one or more computing devices, if any one or more portions of the initial estimate of the location of the user device conflict with the set of permissible areas that can potentially include the user device; and
    revising, by the one or more computing devices, the initial estimate to provide a revised estimate for the location of the user device based at least in part on the set of permissible areas, by removing the one or more portions of the initial estimate that conflict with the set of permissible areas, the revised estimate corresponding to positional coordinates of the user device.

2. The computer-implemented method of claim 1, wherein the sensor data comprises information indicative of the location of the user device.

3. The computer-implemented method of claim 1, further comprising:
obtaining, by the one or more computing devices, sensor data from at least one of a motion sensor, an audio sensor, an image sensor, and a condition sensor provided within the user device.

4. The computer-implemented method of claim 1, further comprising:
obtaining, by the one or more computing devices, the initial estimate from one or more location sensors provided within the user device, wherein the initial estimate comprises one or more approximate locations associated with the user device at a given time.

5. The computer-implemented method of claim 1, wherein the revised estimate comprises data indicative of whether the user device is inside a building or outside a building, based at least in part on the sensor data.

6. The computer-implemented method of claim 1, wherein the one or more physical boundaries includes one or more exterior building walls, interior building walls, fences, barriers, or other physical boundaries restricting movement of the user device within the geographic area at least partially surrounding the user device.

7. The computer-implemented method of claim 1, wherein the initial estimate is based at least in part on a revised estimate for a previous location of the user device.

8. The computer-implemented method of claim 1, wherein the initial estimate comprises at least one of GPS data, WiFi reception data, and cellular reception data.

9. The computer-implemented method of claim 1, further comprising:
transmitting, by the one or more computing devices, the initial estimate to a maps server; and
receiving, by the one or more computing devices, from the maps server, the maps information corresponding to the geographic area at least partially surrounding the initial estimate of the location of the user device.

10. The computer-implemented method of claim 1, further comprising:
retrieving, by the one or more computing devices, previously obtained maps information.

11. The computer-implemented method of claim 1, wherein the initial estimate comprises a plurality of approximate locations associated with the user device at a given time.

12. The computer-implemented method of claim 11, wherein each of the plurality of approximate locations associated with the user device is obtained from a different source.

13. A computing system, comprising:
one or more processors; and
one or more memory devices, the one or more memory devices storing computer-readable instructions that when executed by the one or more processors cause the one or more processors to perform operations, the operations comprising:
obtaining an initial estimate of a location of a user device;
obtaining maps information corresponding to a geographic area at least partially surrounding the initial estimate of the location of the user device, the maps information including one or more physical boundaries located at least in part within the geographic area at least partially surrounding the initial estimate of the location of the user device, wherein the maps information associates features within an environment of the user device as being conditioned on one or more other parameters including a mode of travel such that a first feature is incompatible with a first mode of travel and a second feature is incompatible with a second mode of travel;
obtaining sensor data from one or more sensors provided within the user device;
determining the mode of travel based on the sensor data;
determining a set of permissible areas that can potentially include the user device, wherein the set of permissible areas is determined based at least in part on the one or more physical boundaries and at least in part on the mode of travel such that when the mode of travel is determined to be the first mode of travel, permissible areas corresponding to the first feature are excluded from the set of permissible areas and when the mode of travel is determined to be the second mode of travel, permissible areas corresponding to the second feature are excluded from the set of permissible areas;
determining if any one or more portions of the initial estimate of the location of the user device conflict with the set of permissible areas that can potentially include the user device; and
revising the initial estimate to provide a revised estimate for the location of the user device based at least in part on the set of permissible areas, by removing the one or more portions of the initial estimate that conflict with the set of permissible areas, the revised estimate corresponding to positional coordinates of the user device.

14. A user device, comprising:
one or more location sensors to obtain an initial estimate of a location of a user device;
a maps application to obtain maps information corresponding to a geographic area at least partially surrounding the initial estimate of the location of the user device, the maps information including one or more physical boundaries located at least in part within the geographic area at least partially surrounding the initial estimate of the location of the user device, wherein the maps information associates features within an environment of the user device as being conditioned on one or more other parameters including a mode of travel such that a first feature is incompatible with a first mode of travel and a second feature is incompatible with a second mode of travel;
one or more device sensors configured to provide sensor data indicative of the location of the user device; and
one or more computing devices to:
obtain sensor data from the one or more location sensors;
determine the mode of travel based on the sensor data;
determine a set of permissible areas that can potentially include the user device, wherein the set of permissible areas is determined based at least in part on the one or more physical boundaries and the mode of travel;
determine if any one or more portions of the initial estimate of the location of the user device conflict with the set of permissible areas that can potentially include the user device such that when the mode of travel is determined to be the first mode of travel, permissible areas corresponding to the first feature are excluded from the set of permissible areas and when the mode of travel is determined to be the second mode of travel, permissible areas corresponding to the second feature are excluded from the set of permissible areas; and revise the initial estimate to provide a revised estimate for the location of the user device based at least in part on the set of permissible areas by removing the one or more portions of the initial estimate that conflict with the set of permissible areas.

15. The user device of claim 14, wherein the one or more device sensors comprise a barometer configured to measure atmospheric pressure, and wherein the revised estimate for the location of the user device includes an elevation position of the user device.

16. The user device of claim 14, wherein the one or more device sensors comprise an audio sensor configured to obtain audio sensor data, and wherein the revised estimate for the location of the user device includes data indicative of whether the user device is inside a building or outside a building, based at least in part on the sensor data.

\* \* \* \* \*